July 31, 1928.  1,678,846

W. A. COATES ET AL

ELECTRICAL SWITCH GEAR

Filed June 18, 1921    2 Sheets-Sheet 1

WITNESSES:
John W. Whiting
J. H. Kendig

INVENTORS
William Anselm Coates,
David Reginald Davies &
George Edward Gittins.
BY
Wesley Glearr
ATTORNEY

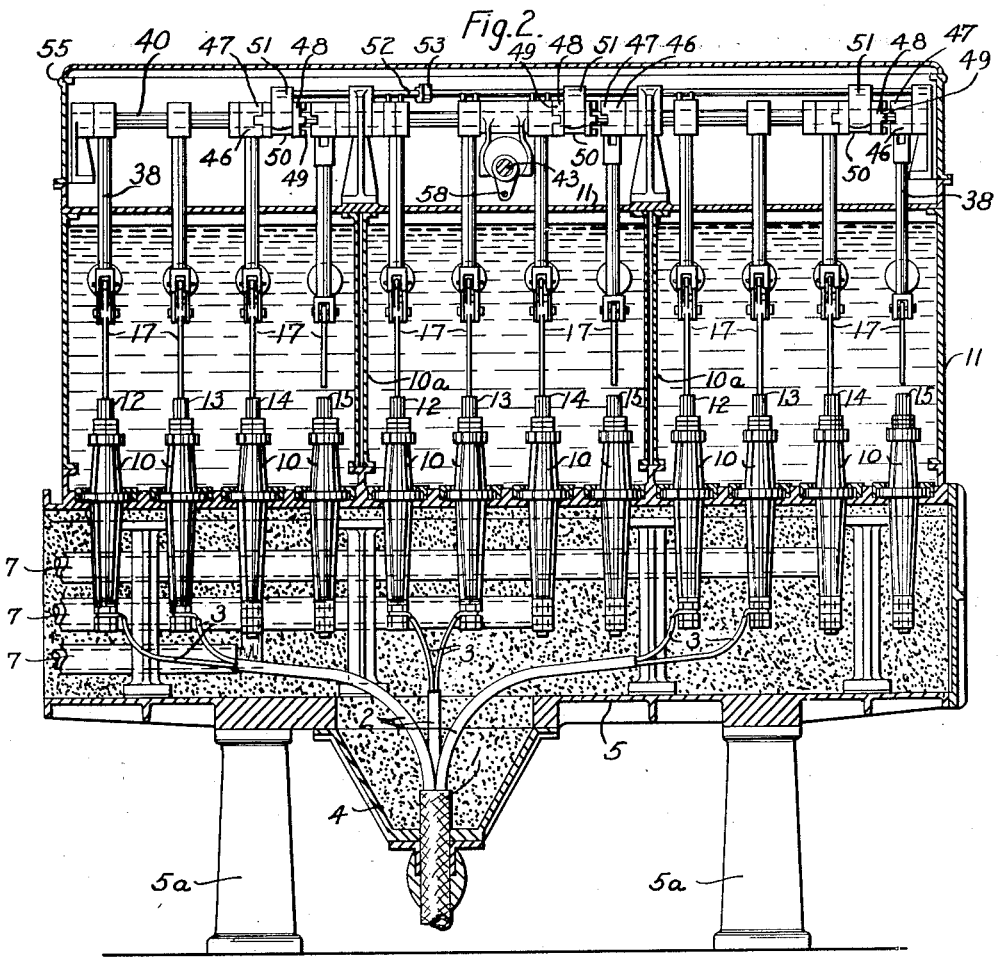
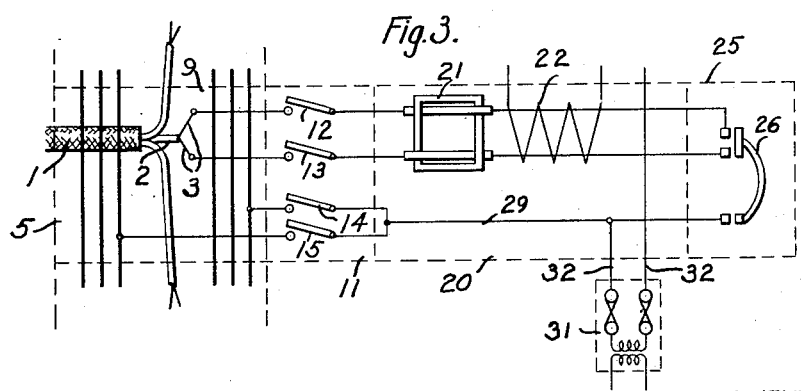

Patented July 31, 1928.

1,678,846

UNITED STATES PATENT OFFICE.

WILLIAM ANSELM COATES, OF CHORLTON-CUM-HARDY, AND GEORGE EDWARD GITTINS AND DAVID REGINALD DAVIES, OF MANCHESTER, ENGLAND, ASSIGNORS TO WESTINGHOUSE ELECTRIC & MANUFACTURING COMPANY, A CORPORATION OF PENNSYLVANIA.

ELECTRICAL SWITCH GEAR.

Application filed June 18, 1921, Serial No. 784,594, and in Great Britain June 22, 1920.

This invention relates to electrical switch gear of what is commonly known as the iron-clad type in which the various switches, conductors, instrument and transformers which are or may be connected between the oil switch and the bus-bars are enclosed in casings, usually of metal, which are afterwards filled with oil or a solid insulating material.

Our invention has for its object to provide an improved construction of switch gear of the above-indicated type.

The chief feature of the invention consists in the provision of a casing or a chamber in which the bus-bars are located and into which the ends of the cables and ends of the conductors which are connected to the bus-bars or cables are led, the chamber being filled with a solid insulating material which may be, for example, a compound of some bituminous insulating material after the necessary permanent connections have been made between the conductors and the bus-bars or the cables, as the case may be.

In carrying out our invention, the chamber above referred to, hereinafter termed for convenience the bus-bar chamber, may consist of a tube of suitable form which may be built up of cast metal sections for example, extending horizontally in front of the switch gear apparatus. The bus-bars may extend along the front and back of the chamber and the cables may be led in at the bottom, the conductors leading to the isolating and selector switches passing out through suitable bushings at the top.

After all the permanent connections have been made between the cables and bus-bars and the conductors, the chamber is filled with an insulating compound. At the top of the chamber is provided a receptacle or receptacles containing the isolating and selector switches which may conveniently be of the knife blade type, the operating rods of which are preferably made of insulating material passing out through the top of the receptacle to the operating gear which may be of any suitable description. One terminal of the switch will be connected to a conductor which passes through the top of bus-bar chamber and the other terminal may be connected to a conductor which passes out horizontally at the back of the receptacle through a suitable bushing into another casing or compartment adapted to contain such transformers as may be provided for use with various measuring instruments or forming part of the protective gear. At the back of the transformer compartment is a compartment forming the top of the usual oil switch or circuit breaker and connections are made between the transformers and the oil switch terminals through bushings in the separating wall of these two compartments. The potential transformer is conveniently mounted on the top of the transformer chamber.

To enable the invention to be clearly understood, it will now be described with reference to the accompanying drawings which illustrate, by way of example, a construction of switch gear in accordance with our invention as applied to a three-phase electrical system with split conductor protection.

Fig. 2 is a section on the line II—II of Fig. 1, looking in the direction of the arrow, showing the isolating and selector switches and the selecting mechanism for the latter.

Fig. 3 is an electrical diagram of one phase of the switch gear.

Figure 1:
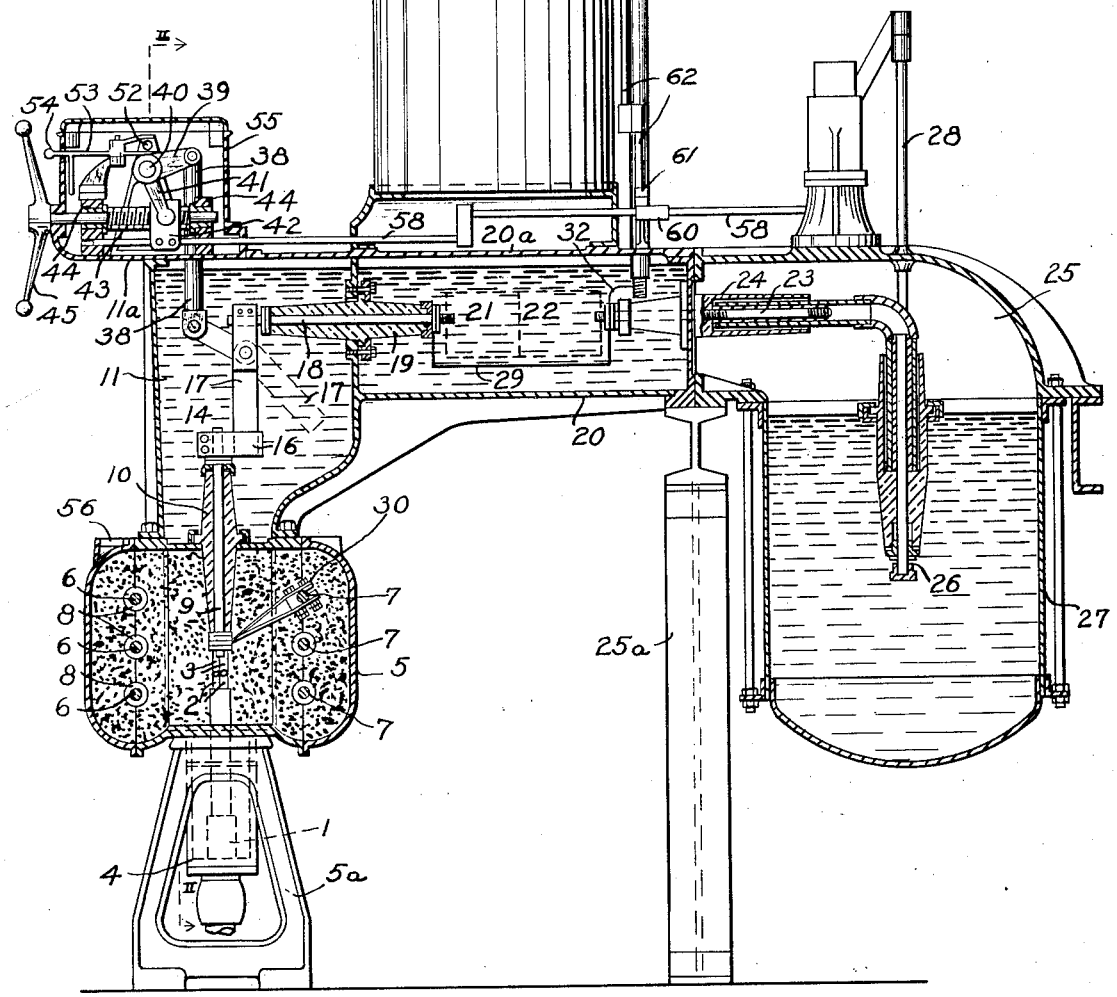
Figure 1 is a sectional side elevation of the switch gear showing more especially the essential elements of one phase of the system.

In the drawings, 1 is the cable, which may be the incoming cable of the feeder for example, and 2 represents the phase conductors of the cable which, as illustrated by way of example, is of the three-phase split conductor type, the phase conductors 2 each comprising the two conductors 3. The cable 1 is secured in a familiar manner into a sealing box or pothead 4.

Referring now more particularly to Figs. 1 and 2, the bus-bar chamber is indicated at 5 and consists of a tube of substantially rectangular section built up of cast metal sections as clearly shown in Fig. 1. This chamber is supported on pedestals 5ª, and extends horizontally across the front of the switch gear as shown more clearly in Fig. 2, with the bus-bars 6 and 7 arranged along the front and the back. As best shown in Fig. 1, the main bus-bars 6 are provided in the front of the casing and auxiliary or "hospital" bus-bars 7 are indicated at the rear of the bus-bar chamber 5, although it will be understood that only one set of bus-bars may in some cases be provided. The said bus-bars advantageously comprise copper-rod conductors arranged in insulating tubes 8 filled with insulating compound, although in some cases, ordinary single-core lead-covered cable may be employed.

The split conductors 3 of each phase conductor 2 of the cable, as clearly shown in Fig. 2, are connected to metal rods 9, passing in insulating bushings 10 through holes in the top of the bus-bar chamber 5 into a chamber 11 supported and attached to the latter and containing the isolating switches 12 and 13 and the selector switches 14 and 15. A chamber 11 is provided for each phase of the cable, as shown in Fig. 2, said chambers being formed of metal sections fastened together by bolts and nuts as shown, or in any other convenient manner.

The isolating and selector switches are preferably arranged side-by-side in the same axial line along the front of the switch gear and all such switches which are to be opened or closed, that is to say, six isolating and three selector in a three-phase split conductor system with duplicate bus-bars, are arranged to be operated simultaneously as hereinafter described.

The isolating switches are preferably of the knife-blade type, the fixed contacts 16 being secured to the upper ends of rods 9, while the blades 17 are pivoted to rods 18 passing in insulating bushings 19 through holes in the rear of the chambers 11 into receptacles 20 arranged behind the chambers 11. In the case of that part of the circuit between the cable and the oil switch the series transformers, such as the split conductor protection transformers 21 and the instrument transformers 22, or such of these as are provided, are located in the receptacles 20.

The terminals of the transformers are connected by metal rods 23, passing in insulating bushings 24 through holes in the rear walls of the receptacles 20 into chambers 25 constituting the heads or covers of the main oil switches, one of which is indicated at 26, the oil tanks 27 thereof being secured in usual manner to the heads or covers 25.

The chamber 11 and the receptacle 20 may either be formed integral with one another or may be made separate and secured together. They may be supported on a framework, as shown at 25ª, and are provided with metal cover plates 11ª and 20ª. Furthermore, these chambers or receptacles for several phase conductors may be cast integrally and divided by means of partitions such as illustrated at 10ª in Fig. 2. The operating mechanism of the oil switches 26 is indicated as a whole at 28 and may be of any suitable description.

The return leads from the oil switch or circuit breaker, which form part of the circuit between the bus-bars and the oil switch, are formed of rods similar to the rods 23 above described and pass through bushings similar to the bushing 24. Before passing out of the receptacle 20, the lead is divided and two rods similar to the rod 18 pass through bushings similar to the bushings 19 to the terminals of the two selector switches 14 and 15.

The fixed contacts of the selector switches 14 and 15 are carried on rods similar to the rods 9 which pass through bushings into the bus-bar chamber 5. The ends of the rods are connected to the corresponding bus-bars by connectors, one of which is shown at 30 in Fig. 1. The selector switches 14 and 15 are of a construction similar to that of the isolating switches previously described and are arranged co-axially therewith.

A convenient position for the potential transformer 31, where such is provided, is on the cover plate 20ª above the receptacle 20 containing the series transformers, as indicated in Fig. 1. The electrical leads 32 from the conductors in the receptacle 20 to the potential transformers pass up the latter, as shown, through a tube 33 of insulating material such as that commonly known as bakelite, for example. The potential fuses 34 are arranged in the top portion of the transformer casing 31 and, as shown, are immersed in the oil with which the said casing is filled, an insulating barrier 35 being advantageously provided between the said fuses and the transformer proper.

The diagram (Fig. 3) clearly shows the electrical circuits of one phase of the switch gear, the casings and receptacles being indicated in dotted lines. The phase conductors 2 and their split conductors 3 separate in the chamber 5 and are connected through the isolating switches 12 and 13 in the casing 11 with the split conductor transformer 21 and the instrument transformer 22 in the casing 20, and terminate in separate contact blocks constituting one terminal of the oil switch 26. The other terminal of the oil switch is connected by means of a conductor 29 to both of the selector switches 14 and 15 which are connected respectively to one bus-bar in each set, in the manner previously described.

The potential transformer is indicated also in this diagram, one of the leads 32 thereof being connected to the conductor 29 while the other lead is connected to the corresponding conductor of another phase in the usual way.

Referring again to Figs. 1 and 2, the movable blades of the isolating and selector switches are operated by means of rods 38 of insulating material, such as bakelite, the said rods passing through the cover 11ª of the casing 11 and being connected at their upper ends to levers 39. These levers are mounted on a shaft 40 which extends completely across the front of the switch gear, that is, across all the phases in the case of multi-phase systems. Another lever 41 keyed to the shaft engages a grooved collar 42 having screw-threaded engagement with a spindle 43 mounted in bearings 44 and provided with an operating handle or hand-wheel 45.

The levers 39 of the isolating switches 12 and 13 are rigidly connected to the shaft 40, but the bosses 46 of the levers of the selector switches 14 and 15 are loosely mounted thereon and are provided with dog-teeth as indicated at 47. Between the toothed bosses, there is arranged for each phase of the switch gear a striking collar 48 which has counterpart dog-teeth 49 and which is slidably mounted on the shaft 40.

The striking collar 48 is provided with a peripheral groove 50 in which engage forks 51 rigidly attached to a striking rod 52 adapted to be moved longitudinally by means of a lever 53 which extends horizontally to the front of the switch gear and terminates in a handle or knob 54. The arrangement is such that, by shifting the knob 54, the lever 53 may be moved to one side or to the other to effect the engagement of the collar 48 with the boss 46 of either of the selector switches 14 or 15 whereby the corresponding levers 39 are connected to the shaft 40.

It will be readily seen that movement of the collar 42 along the spindle by the operation of handle 45 will cause rotation of shaft 40 and thereby actuate the levers of the isolating switches and those of the selector switches the bosses 46 of which have been operatively connected to the shaft 40 as above described. The switch operating mechanism is enclosed in a casing 55.

When all the permanent connections of the various electrical conductors and devices of the system have been made, the bus-bar chamber 5 is filled with insulating compound, suitable holes such as those indicated at 56 being provided at the top of the said chamber through which the said compound may be poured. The chamber 11, the receptacle 20 and the oil switch tank 27 are filled with oil, as is also the casing 31 of the potential transformer.

The operating mechanisms of the isolating and selector switches are preferably interlocked with the mechanisms for operating the oil switches in such a manner that (1) the isolating and selector switches can not be opened unless the oil switch is open; (2) it will be possible to close the oil switch if all the isolating and selector switches are open; (3) when the oil switch is closed it will not be possible to close the isolating and selector switches, and (4) it will not be possible to remove the oil switch tank or the lid of the potential transformer tank or the covers 11ª and 20ª of the chambers 11 and 20 unless both the oil switch and all isolating and selector switches are open. Interlocking devices of this nature are well known but a specific form is illustrated by way of example in Fig. 1, of which the following is a brief description.

The lid or cover 57 of the potential transformer is interlocked with the oil switch through the medium of a rod 58 that is actuated by the collar 42 of the switch operating mechanism. The rod 58 passes through a keyhole slot in the plate 61 which is attached to the lower end of the rod 62. The upper end of the rod operatively engages the cover 57 and is moved upward when the cover is moved to open position.

The rod 58 is provided with an enlargement 60 which enters the enlarged portion of the keyhole slot when the cover 57 is closed and when the oil and isolating switches are in closed position. The enlargement 60 therefore prevents opening movement of the cover 57 while the oil and isolating switches are in closed position. When the oil and isolating switches are in open position and the cover 57 is open, it will be impossible to close the said switches because of the interference of the narrow portion of the keyhole slot with movement of the enlargement 60.

In a similar manner, the oil switch is provided with a slotted plate, not shown, which co-operates with an enlargement, not shown, on the operating rod 58 to insure proper sequence of operation of the oil and isolating switches.

An interlock of a similar or other suitable form is also provided for the tank 27 of the oil switch 26. Such interlocking mechanisms are well known and form no part of the present invention so that a full description thereof is deemed unnecessary.

By using isolating and selector switches of the knife-blade type, an economy in the number of insulators is effected and greater constructional simplicity is obtained. It will be understood that the fused contacts of the switch may be on the oil switch side of the switches instead of on the bus-bar or cable side as shown.

It will be understood that the switch gear may be modified in various constructional ways without departing from the scope of the invention. For example, the chamber 5, the chamber 11 and receptacle 20, the oil switch 26 and the potential transformer may be located in other positions relatively to one another although the above described arrangement is preferred while in certain cases the transformer devices may be absent.

When the bus-bars are not provided in duplicates, certain of the so-called selector switches are omitted and those remaining would be more properly termed isolating switches. Although the invention has been referred to as relating to iron-clad switch gear and the various casings are usually made of iron, it will be understood that other metal, for instance, a non-magnetic metal, might be used when dealing with heavy currents. It will also be understood that the invention is in no way restricted to three-phase systems but may be used with other systems of electrical distribution.

We claim as our invention:—

1. Electrical switch gear comprising a pair of closed housings for electrical devices having conducting terminals projecting therefrom into a third closed housing, and a switch member within the third housing and mounted upon a terminal projecting from one housing and movable into engagement with a terminal projecting from the other housing.

2. In electric switch gear, a distributing box comprising a substantially tubular compound filled housing having feed conductors extending longitudinally thereof adjacent opposite sides of the housing, terminal bushings mounted on the wall of the housing and extending thereinto and between the feed conductors and conductors connecting the terminals to their respective feed conductors.

3. In electrical switch gear, a distributing box comprising a substantially tubular housing having two separate sets of feed conductors extending longitudinally thereof and disposed at opposite sides of the housing, terminal bushings extending into the housing and terminating adjacent to the longitudinal axis of the housing and between the sets of conductors and conductors for connecting the terminals to their respective feed conductors.

4. Electrical switch gear housing comprising a feed conductor housing, an isolating switch housing mounted on the upper side thereof, a transformer housing secured to one side of the switch housing, supports for the feed conductor housing and the free end of the transformer housing and an oil switch housing comprising a cover portion that is attached to the free end of the transformer housing and an oil tank suspended from the said cover portion.

In testimony whereof, we have hereunto subscribed our names this first day of June 1921.

WILLIAM ANSELM COATES.
GEORGE EDWARD GITTINS.
DAVID REGINALD DAVIES.